US012275370B2

(12) United States Patent
Thomas et al.

(10) Patent No.: US 12,275,370 B2
(45) Date of Patent: Apr. 15, 2025

(54) SYSTEM AND METHOD FOR DETERMINING WHETHER A SEATBELT BUCKLE EXTENDER IS USED IN CONJUNCTION WITH A SEATBELT

(71) Applicant: GM Global Technology Operations LLC, Detroit, MI (US)

(72) Inventors: Scott D. Thomas, Novi, MI (US); Sean Taylor Coughlin, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/365,016

(22) Filed: Aug. 3, 2023

(65) Prior Publication Data
US 2025/0042355 A1 Feb. 6, 2025

(51) Int. Cl.
*B60R 22/48* (2006.01)

(52) U.S. Cl.
CPC ...... *B60R 22/48* (2013.01); *B60R 2022/4825* (2013.01); *B60R 2022/4866* (2013.01)

(58) Field of Classification Search
CPC ............ B60R 22/03; B60R 2022/4816; B60R 21/01546; B60R 22/48; B60R 2022/4825; B60R 2022/4866
See application file for complete search history.

(56) References Cited

U.S. PATENT DOCUMENTS

| | | | | |
|---|---|---|---|---|
| 5,906,393 A | * | 5/1999 | Mazur | G01G 19/4142 280/735 |
| 6,213,512 B1 | * | 4/2001 | Swann | B60R 22/46 297/480 |
| 6,282,473 B1 | * | 8/2001 | Steffens, Jr. | B60R 21/01536 701/45 |
| 7,717,215 B2 | * | 5/2010 | Tanaka | B60R 22/46 280/806 |
| 7,761,207 B2 | * | 7/2010 | Midorikawa | B60R 22/44 701/45 |
| 9,637,083 B2 | * | 5/2017 | Schlittenbauer | B60R 22/02 |
| 9,676,356 B2 | * | 6/2017 | Ghannam | B60R 21/01544 |
| 10,272,872 B2 | * | 4/2019 | Le | B60R 21/01548 |
| 10,688,951 B2 | | 6/2020 | Coughlin et al. | |

(Continued)

FOREIGN PATENT DOCUMENTS

DE 102016014867 A1 6/2017

*Primary Examiner* — Timothy Wilhelm
(74) *Attorney, Agent, or Firm* — Honigman LLP; Matthew H. Szalach; Jonathan P. O'Brien

(57) ABSTRACT

A system includes a first webbing payout sensor configured to detect a first webbing payout of a seatbelt associated with a vehicle seat, the first webbing payout being a length of webbing extended from a retractor of the seatbelt, an occupant detection module configured to identify a state of the vehicle seat, the occupant detection module identifying an occupied state when an occupant is seated on the vehicle seat and an unoccupied state when the vehicle seat is free from an occupant, and a seatbelt wear condition module in communication with the first webbing payout sensor and the occupant detection module and configured to identify whether a seatbelt buckle extender is used in conjunction with the seatbelt based on the first webbing payout and the state of the vehicle seat identified by the occupant detection module.

20 Claims, 8 Drawing Sheets

(56) References Cited

U.S. PATENT DOCUMENTS

| | | | |
|---|---|---|---|
| 10,953,850 B1* | 3/2021 | Pertsel | B60R 21/01538 |
| 10,994,696 B2 | 5/2021 | Thomas et al. | |
| 11,059,453 B2 | 7/2021 | Thomas et al. | |
| 11,117,545 B2* | 9/2021 | Thomas | B60R 22/48 |
| 11,167,719 B2* | 11/2021 | Song | B60R 21/013 |
| 11,491,940 B2 | 11/2022 | Thomas | |
| 11,603,060 B2* | 3/2023 | Thomas | B60R 21/01536 |
| 11,691,586 B2* | 7/2023 | Fischer | B60R 21/233 |
| | | | 280/733 |
| 11,794,690 B2* | 10/2023 | Thomas | B60R 25/305 |
| 11,884,232 B2* | 1/2024 | Gaither | B60R 22/03 |
| 2018/0345893 A1* | 12/2018 | Imanaka | B60R 21/01516 |
| 2020/0216005 A1* | 7/2020 | Stegmeier | B60R 21/01548 |
| 2022/0063554 A1 | 3/2022 | Thomas | |

* cited by examiner

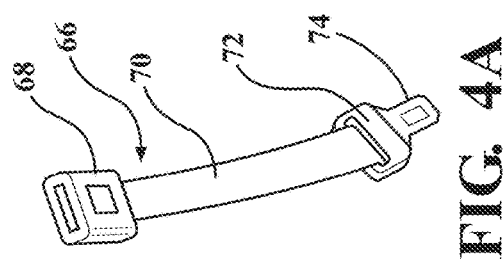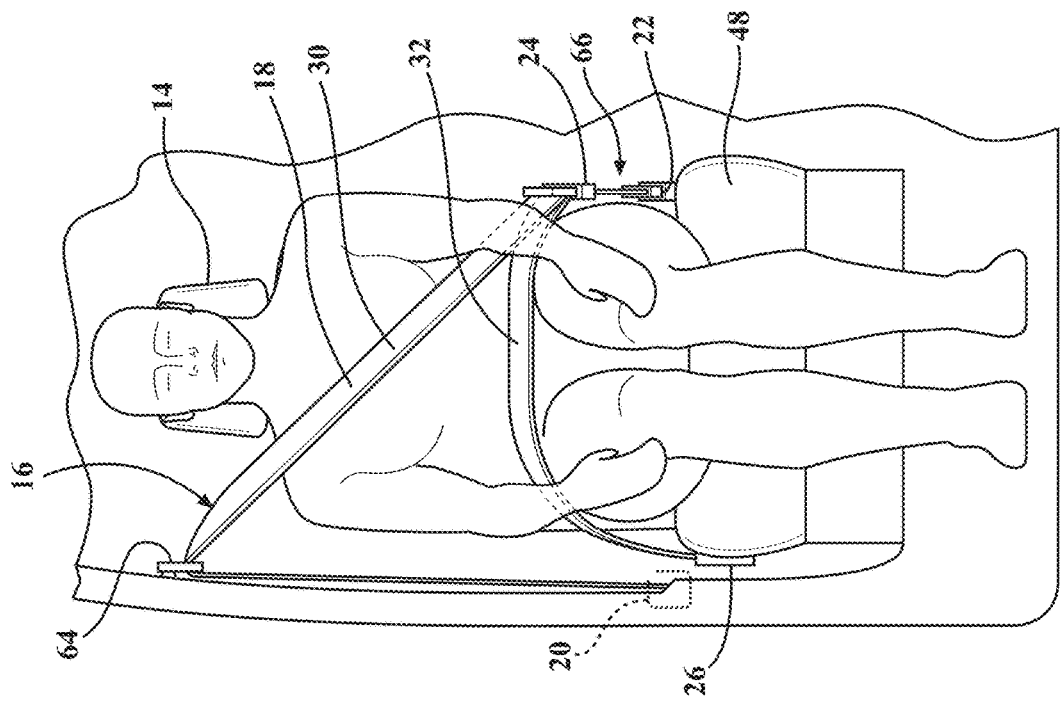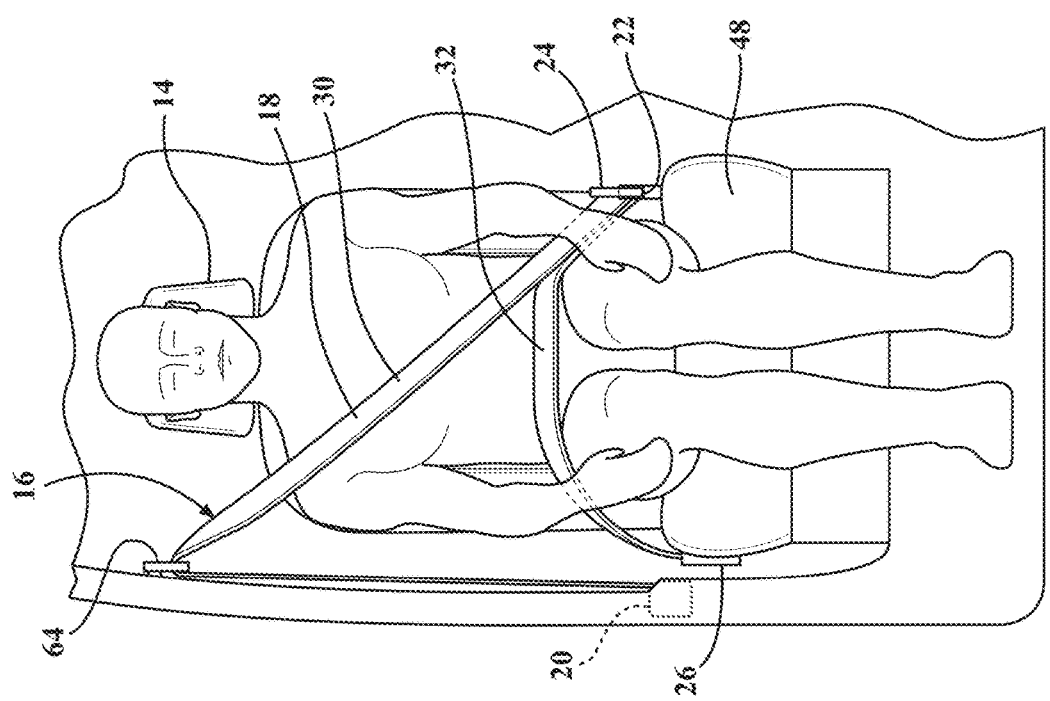

SYSTEM AND METHOD FOR DETERMINING WHETHER A SEATBELT BUCKLE EXTENDER IS USED IN CONJUNCTION WITH A SEATBELT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates to a system and method for determining use of a seatbelt buckle extender in conjunction with a seatbelt assembly.

Restraint systems are used in modern vehicles to restrain an occupant during use of the vehicle. Such systems may include one or more airbags located proximate to each seating location of the vehicle that work in conjunction with a seatbelt assembly dedicated for use with a particular seating location.

Conventional seatbelt assemblies typically include seatbelt webbing, a tongue or latch plate, a seatbelt buckle, a retractor, a lower anchor, and a seatbelt guide or D-ring that receives the seatbelt webbing and properly positions the seatbelt webbing relative to an occupant during use. The seatbelt webbing is typically anchored at a first end to a vehicle structure by the lower anchor and extends up from the vehicle structure in a direction toward a vehicle seat. The seatbelt webbing continues in a direction towards the guide loop or D-ring where the seatbelt webbing is routed through the guide loop or D-Ring before being received by the retractor. The retractor is typically mounted to vehicle structure or a seat and permits payout of the seatbelt when an occupant exerts a force on the seatbelt webbing to extract a desired length of the seatbelt webbing from the retractor. The seatbelt webbing slidably receives the tongue or latch plate along a length of the seatbelt webbing. The tongue or latch plate may be selectively attached to the seatbelt buckle on an opposite side of the vehicle seat than the lower anchor to restrain an occupant in the vehicle seat during use. The seatbelt retractor also serves to automatically retract/pull the seatbelt webbing into the retractor when the tongue or latch plate is disengaged from the seatbelt buckle, thereby returning the seatbelt webbing to a stowed state.

In operation, a user may sit in a vehicle seat and apply a force on the seatbelt webbing and/or on the tongue or latch plate to extract a desired length of the seatbelt webbing from the retractor. The retractor, in response to the force applied to the seatbelt webbing and/or the tongue or latch plate, permits a length of the seatbelt webbing to be extracted from the retractor, thereby increasing the effective length of the seatbelt webbing between the retractor and the lower anchor. Once a desired length of the seatbelt webbing is achieved, the occupant aligns the tongue or latch plate with the seatbelt buckle and inserts the tongue or latch plate into the seatbelt buckle, thereby fixing a relative position of the tongue or latch plate and the seatbelt buckle. At this point, when the seatbelt is properly worn, the seatbelt webbing extends across an upper torso of the occupant from the D-ring or retractor to the tongue or latch plate and extends from the tongue or latch plate across a lap of the occupant between the tongue or latch plate and the lower anchor. Once the tongue or latch plate is attached to the seatbelt buckle, the retractor restricts further payout of the seatbelt webbing to restrain the occupant in the vehicle seat during an impact. Under normal use conditions, the retractor pulls slightly on the seatbelt so that any slack is removed while the seatbelt is routed around an occupant.

When the occupant wishes to leave the vehicle seat, a force may be applied to button of the seatbelt buckle to release the tongue or latch plate from the seatbelt buckle. At this point, the retractor automatically spools the seatbelt webbing, thereby reducing an effective length of the seatbelt webbing between the retractor and the lower anchor. Once a predetermined length of the seatbelt webbing is retracted into the retractor, the seatbelt is returned to the stowed state.

While conventional seatbelt assemblies secure an occupant in a vehicle seat during use, some occupants require use of a seatbelt buckle extender to allow the seatbelt webbing to be properly fitted to the occupant's upper torso and lap. For example, larger occupants may require a length of seatbelt webbing that exceeds a conventional length of seatbelt webbing to properly position the seatbelt webbing over an upper torso and lap of the larger occupant or to permit occupant movement while buckled without triggering the retractor ratcheting mechanism, which is engaged when a child restraint seat is installed via the seatbelt system. In such circumstances, a seatbelt buckle extender may be utilized and positioned between the seatbelt webbing and the seatbelt buckle to effectively increase the length of the seatbelt webbing. For example, a seatbelt buckle extender may include a length of seatbelt webbing extending between a tongue or latch plate at one end and a seatbelt buckle at an opposite end.

In operation, the tongue or latch plate associated with seatbelt buckle extender may be inserted into the seatbelt buckle while the tongue or latch plate associated with the seatbelt webbing may be inserted into the seatbelt buckle of the seatbelt buckle extender. In so doing, the seatbelt buckle extender effectively moves the attachment point of the tongue or latch plate associated with the seatbelt webbing closer to the D-ring or retractor, thereby reducing the length of the seat webbing the must be extended from the retractor to properly fit over the upper torso and lap of the vehicle occupant.

While conventional seatbelt buckle extenders permit a larger occupant to properly position seatbelt webbing of a seatbelt assembly over an upper torso and a lap of the occupant, such seatbelt buckle extenders may be difficult to detect by a monitoring system associated with the seatbelt assembly. For example, a monitoring system associated with the seatbelt assembly might conclude that a tongue or latch plate of the seatbelt assembly is attached to the seatbelt buckle when, in fact, a tongue or latch plate of a seatbelt buckle extender is attached to the seatbelt buckle. Accordingly, a need exists for differentiating between times when a seatbelt assembly is used with a seatbelt buckle extender and without a seatbelt buckle extender to permit a monitoring system associated with the seatbelt assembly to properly monitor and diagnose use and the routing condition of the seatbelt assembly.

SUMMARY

In one configuration, a system includes a first webbing payout sensor configured to detect a first webbing payout of a seatbelt associated with a vehicle seat, the first webbing payout being a length of webbing extended from a retractor of the seatbelt, an occupant detection module configured to identify a state of the vehicle seat, the occupant detection module identifying an occupied state when an occupant is seated on the vehicle seat and an unoccupied state when the vehicle seat is free from an occupant, and a seatbelt wear condition module in communication with the first webbing payout sensor and the occupant detection module and configured to identify whether a seatbelt buckle extender is used in conjunction with the seatbelt based on the first webbing payout and the state of the vehicle seat identified by the occupant detection module.

The system may include one or more of the following optional features. For example, the occupant detection module may be in communication with at least one sensor configured to determine the presence of an occupant on the vehicle seat. The at least one sensor may include at least one of a pressure sensor, a weight sensor, and a capacitive sensor located in the vehicle seat and a remote sensor including at least one of a camera, radar, and LIDAR having a field-of-view that encompasses the vehicle seat. Additionally or alternatively, the first webbing payout sensor may be located at the retractor.

A buckle sensor may be in communication with the seatbelt wear condition module, the buckle sensor configured to detect a buckled state when a latch plate is secured to a buckle of the seatbelt and an unbuckled state when the buckle is separated from a latch plate. The seatbelt wear condition module may be configured to determine use of a seatbelt buckle extender based on the buckle sensor identifying the buckled state, the occupant detection module identifying the unoccupied state at the time of buckling, and a payout of the webbing. The payout of the webbing may be less than a predetermined threshold at the time of buckling indicating that the seatbelt was in a stowed state at the time of buckling. Alternatively, the payout of the webbing may be greater than a predetermined threshold indicating that the seatbelt was worn.

In one configuration, the seatbelt wear condition module may be configured to determine use of a seatbelt buckle extender in response to the buckle sensor identifying the unbuckled state, the occupant detection module identifying the unoccupied state, and the first webbing payout being greater than a stowed webbing length.

In another configuration, a system includes a first webbing payout sensor configured to detect a first webbing payout of a seatbelt associated with a vehicle seat, the first webbing payout being a length of webbing extended from a retractor of the seatbelt, a buckle sensor configured to detect a buckled state when a latch plate is secured to a buckle of the seatbelt and an unbuckled state when the buckle is separated from a latch plate, and a seatbelt wear condition module in communication with the first webbing payout sensor and the buckle sensor, the seatbelt wear condition module configured to identify whether a seatbelt buckle extender is used in conjunction with the seatbelt based on the first webbing payout and the state of the buckle identified by the buckle sensor.

The system may include one or more of the following optional features. For example, an occupant detection module may be configured to identify a state of the vehicle seat, the occupant detection module identifying an occupied state when an occupant is seated on the vehicle seat and an unoccupied state when the vehicle seat is free from an occupant. The occupant detection module may be in communication with at least one sensor configured to determine the presence of an occupant on the vehicle seat. The at least one sensor may include at least one of a pressure sensor, a weight sensor, and a capacitive sensor located in the vehicle seat and a remote sensor including at least one of a camera, radar, and LIDAR having a field-of-view that encompasses the vehicle seat.

The seatbelt wear condition module may be configured to determine use of a seatbelt buckle extender based on the buckle sensor identifying the buckled state, the occupant detection module identifying the unoccupied state at the time of buckling, and a payout of the webbing. The payout of the webbing may be less than a predetermined threshold at the time of buckling indicating that the seatbelt was in a stowed state at the time of buckling. Alternatively, the payout of the webbing may be greater than a predetermined threshold indicating that the seatbelt was worn.

In one configuration, the seatbelt wear condition module may be configured to determine use of a seatbelt buckle extender in response to the buckle sensor identifying the unbuckled state, the occupant detection module identifying the unoccupied state, and the first webbing payout being greater than a stowed webbing length. In another configuration, the seatbelt wear condition module may be configured to determine use of a seatbelt buckle extender based on (i) the buckle sensor identifying the buckled state, (ii) the occupant detection module identifying an occupied state at the time of buckling, (iii) the first webbing payout sensor determining that the webbing payout from the retractor is less than a first predetermined threshold at the time of buckling indicating that the seatbelt was in a stowed state at the time of buckling, and (iv) the first webbing payout sensor determining that the webbing payout from the retractor is more than a second predetermined threshold after buckling indicating that the seatbelt was in a worn state.

In yet another configuration, a system may include a first webbing payout sensor configured to detect a first webbing payout of a seatbelt associated with a vehicle seat, the first webbing payout being a length of webbing extended from a retractor of the seatbelt, an occupant detection module configured to identify a state of the vehicle seat, the occupant detection module identifying an occupied state when an occupant is seated on the vehicle seat and an unoccupied state when the vehicle seat is free from an occupant, a buckle sensor configured to detect a buckled state when a latch plate is secured to a buckle of the seatbelt and an unbuckled state when the buckle is separated from a latch plate, and a seatbelt wear condition module in communication with the first webbing payout sensor, the buckle sensor, and the occupant detection module and configured to identify a lazy seatbelt condition in response to the buckle sensor identifying the unbuckled state, the occupant detection module identifying the unoccupied state, and the first webbing payout being greater than a stowed webbing length.

The system may include one or more of the following optional features. For example, the seatbelt wear condition module may identify use of a seatbelt buckle extender in conjunction with the seatbelt when the lazy seatbelt condition is identified.

In one configuration, the seatbelt wear condition module may be in communication with a user interface device configured to display a state of the seatbelt. The user interface device may include a display, the lazy seatbelt condition being communicated via the display.

BRIEF DESCRIPTION OF THE DRAWINGS

The drawings described herein are for illustrative purposes only of selected configurations and are not intended to limit the scope of the present disclosure.

FIG. 3 is a front view of an occupant using a seatbelt assembly without a seatbelt buckle extender;

FIG. 4 is a front view of an occupant using a seatbelt assembly in conjunction with a seatbelt buckle extender;

FIG. 4A is a perspective view of a seatbelt buckle extender for use in conjunction with a seatbelt assembly;

Corresponding reference numerals indicate corresponding parts throughout the drawings.

DETAILED DESCRIPTION

Figure 1:
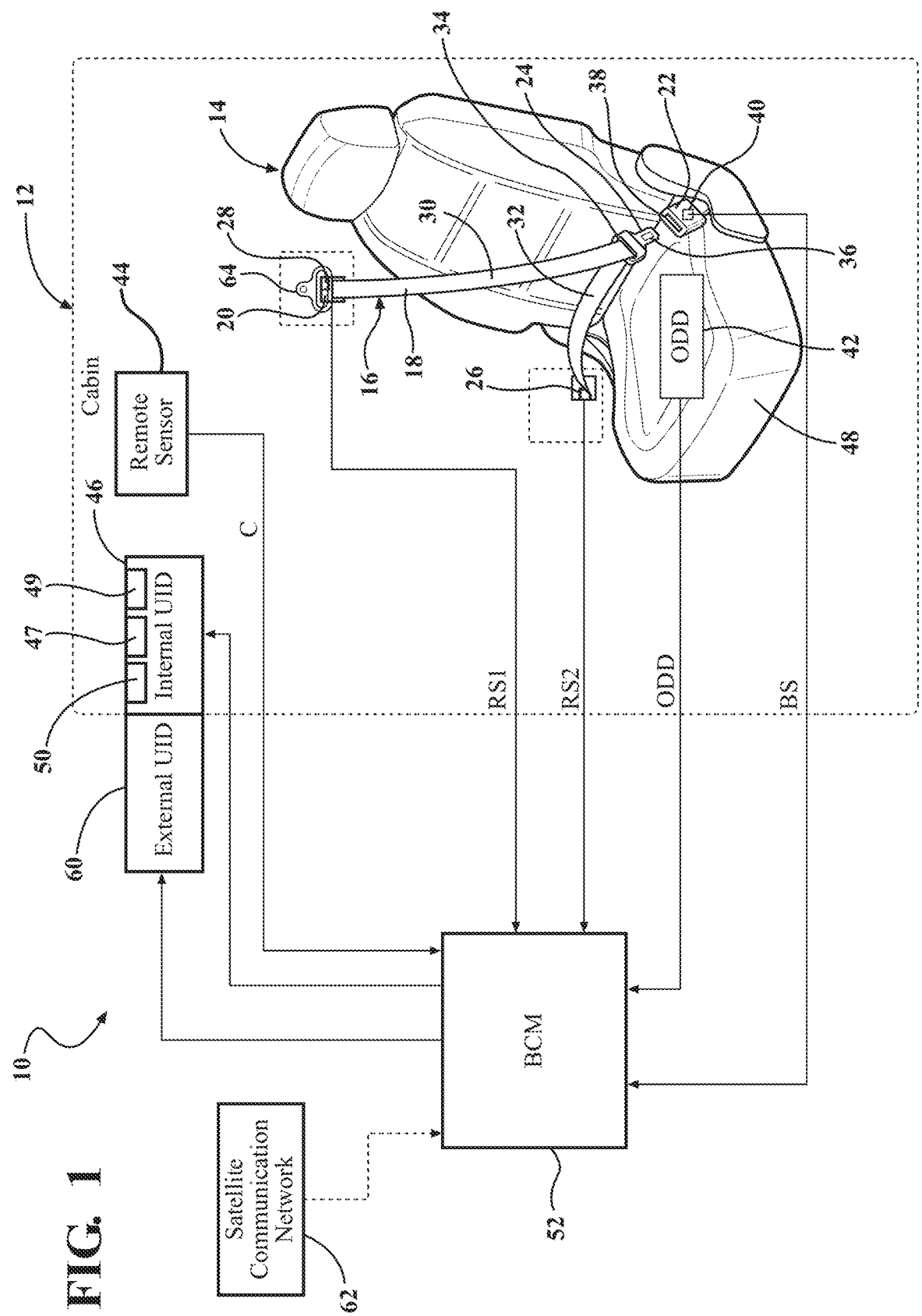
FIG. 1 is a schematic view of a vehicle system according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A system and method may use the output of a seatbelt payout sensor, an occupant detection sensor, and a seatbelt buckle sensor to determine whether a seatbelt of a seatbelt assembly is worn correctly by a vehicle occupant. The seatbelt payout sensor is associated with a seatbelt retractor and measures the payout or length of a seatbelt that extends from the seatbelt retractor. The occupant detection sensor determines if the seat is occupied by an occupant. The seatbelt buckle sensor is associated with a seatbelt buckle and detects whether a tongue or a latch plate associated with a seatbelt of the seatbelt assembly is inserted into and secured within the seatbelt buckle.

The system and method may be used in conjunction with a seatbelt assembly to determine whether a seatbelt buckle extender is being used with the seatbelt assembly. Namely, the system and method may utilize information from the seatbelt payout sensor and the buckle sensor in conjunction with occupant detection sensor(s) to determine whether a seatbelt buckle extender is currently in use and, if so, whether the seatbelt of the seatbelt assembly is properly worn.

In one example, an occupant detection module may cooperate with a seatbelt wear condition module to determine whether an occupant is seated in a vehicle seat and, based on information from the seatbelt payout sensor and the seatbelt buckle sensor, can determine whether a seatbelt buckle extender is in use. For example, if the seatbelt buckle sensor determines that a tongue or latch plate is inserted into the seatbelt buckle, and the seatbelt payout sensor determines that the seatbelt is in a stowed position, the system and method may determine that a seatbelt buckle extender is inserted into and secured to the seatbelt buckle rather than a tongue or latch plate associated with the seatbelt of the seatbelt assembly. In other words, the system and method may determine that a tongue or latch plate associated with a seatbelt buckle extender is inserted into and received by the seatbelt buckle rather than the tongue or latch plate associated with the seatbelt if the seatbelt buckle sensor identifies the presence of a tongue or latch plate but the seatbelt payout sensor has not detected payout of seatbelt webbing from a seatbelt retractor.

The forgoing information may be used in conjunction with information from the occupant detection module, which determines whether an occupant is seated in a vehicle seat. For example, the system and method may determine that a seatbelt buckle extender is inserted and attached to the seatbelt buckle rather than a tongue or latch plate associated with the seatbelt assembly if the seatbelt buckle detects the presence of a tongue or latch plate but an occupant is not detected by the occupant detection module. Such a conclusion can be validated by using information from the seatbelt payout sensor if information from the seatbelt payout sensor indicates that the seatbelt is in the stowed position. As will be described in greater detail below, the seatbelt wear condition module—based upon information from the seat payout sensor, the seatbelt buckle sensor, and the occupant detection module—may determine whether a seatbelt buckle extender is currently being used in conjunction with the seatbelt assembly and, if so, whether the seatbelt is properly positioned relative to a vehicle occupant.

As another example, an occupant detection module may cooperate with a seatbelt wear condition module to determine if a seatbelt buckle extender is in use when the extender was buckled into the system after the occupant sat on the seat. If the occupant detection sensor indicates occupancy, the seatbelt buckle sensor determines that a tongue or latch plate is inserted into the seatbelt buckle, and the seatbelt payout sensor determines that the seatbelt is in a stowed position and later the seatbelt payout sensor determines that the seat belt is a worn condition length, the method can determine that a seatbelt buckle extender is being used.

The foregoing information with respect to whether a seatbelt buckle extender is in use and/or whether a seatbelt is properly positioned relative to a vehicle occupant may be displayed on an internal user interface device (UID). For example, a UID may include a display disposed within a cabin of the vehicle for use in alerting vehicle occupants whether a seatbelt buckle extender is in use, whether a seatbelt is properly worn, and/or whether a seatbelt buckle extender remains attached to a tongue or latch plate of the seatbelt assembly. The information displayed by the UID disposed within the vehicle cabin may additionally or alternatively be displayed on an external UID. For example, the information determined by the seatbelt wear condition module may be sent to a UID control module for use in transmitting the information determined by the seatbelt wear condition module to an internal UID as well as an external UID. In one configuration, the external UID may include a smartphone or tablet registered to an owner and/or user of the vehicle to alert the owner and/or user of the vehicle as to the state of the seatbelt assembly with respect to use of a seatbelt buckle extender.

With reference to FIG. 1, a vehicle system 10 is provided and includes a cabin 12 having a seat 14 and seatbelt assembly 16 disposed therein. The seatbelt assembly 16 includes seatbelt webbing 18, a retractor 20 (located at or below the location shown in FIG. 1), a seatbelt buckle 22, a tongue or latch plate 24, and an anchor 26. The seatbelt webbing 18 extends between a first end attached to the retractor 20 and a second end attached to the anchor 26.

In one configuration, the retractor 20 is physically attached to a vehicle structure such as, for example, a B-pillar or a C-pillar (neither shown). The seatbelt webbing 18 is received within a body of the retractor 20 and is wound around a spool (not shown) of the retractor 20. The retractor 20 may include a seatbelt payout sensor 28 that detects the length of seatbelt webbing 18 extended from and retracted into the retractor 20. The seatbelt payout sensor 28 may be a Hall-effect sensor or a rotary encoder that determines a number or rotations of a spool of the retractor 20 and, in so doing, can detect the length of a seatbelt webbing 18 that is extended from and/or retracted into the retractor 20. Alternatively, the seatbelt payout sensor 28 may be an optical sensor that can determine a number of rotations of the spool of the retractor 20 and, likewise, can determine the length of the seatbelt webbing 18 extended from and/or retracted into the retractor 20.

The anchor 26 may be attached to vehicle structure or the seat 14 such as, for example, a floor pan (not shown) of a vehicle or a seat-to-floor-pan mount (not shown). As such, the anchor 26 is fixed for movement with the cabin 12. The anchor 26 may receive a first end of the seatbelt webbing 18 to likewise fix the first end of the seatbelt webbing 18 relative to the cabin 12. The end of the seatbelt webbing 18 received by and attached to the vehicle by the anchor 26 is disposed at an opposite end of the seatbelt webbing 18 from the retractor 20.

As thus far described, the seatbelt webbing 18 extends from the anchor 26 at one end of the seatbelt webbing 18 to the retractor 20 at an opposite end of the seatbelt webbing 18. In operation, a user may apply a force on the seatbelt webbing 18 to extract a length of the seatbelt webbing 18 from the retractor 20. The length of the seatbelt webbing 18 extracted from the retractor 20 includes a cross-body segment 30 and lap segment 32. As shown in FIG. 1, the cross-body segment 30 extends generally across a torso of an occupant while the lap segment 32 extends across of a lap of an occupant from the seatbelt buckle 22 to the anchor 26. Accordingly, when a force is exerted on the seatbelt webbing 18 such that a length of the seatbelt webbing 18 is extended from the retractor 20, the cross-body segment 30 and the lap segment 32 cooperate to define the length of the seatbelt webbing 18 extending over the vehicle occupant from the retractor 20 to the seatbelt buckle 22 and from the seatbelt buckle 22 to the anchor 26.

While the seatbelt assembly 16 will be described hereinafter and shown in drawings as including a single retractor 20 used in conjunction with an anchor 26, the seatbelt assembly 16 could incorporate a second retractor in place of the anchor 26. In such a system, the cross-body segment 30 would be supplied entirely from the retractor 20 shown in FIG. 1 while the lap segment 32 would be extended from the retractor replacing the anchor 26. If the seatbelt assembly 16 includes a retractor in place of the anchor 26, the retractor 20 could include a seatbelt payout sensor 28 in an identical fashion as the seatbelt payout sensor 28 associated with the retractor 20.

The tongue or latch plate 24 includes a slot 34 and a projection 36 extending from the slot 34. The slot 34 slidably receives the seatbelt webbing 18 to allow the tongue or latch plate 24 to move relative to and along the seatbelt webbing 18. The projection 36 extends from the slot 34 and is selectively received by the seatbelt buckle 22.

The seatbelt buckle 22 is disposed on an opposite side of the seat 14 than the anchor 26 and includes a slot 38 that selectively receives the projection 36 of the tongue or latch plate 24. The seatbelt buckle 22 may be fixed for movement with the seat 14 or, alternatively, made be fixed to vehicle structure such as, for example, the floor pan of the vehicle. In operation, when an occupant applies a force on the seatbelt webbing 18 such that a length of the seatbelt webbing 18 is extended from the retractor 20, the tongue or latch plate 24 may be positioned relative to the seatbelt buckle 22 such that its projection 36 opposes and is received by the slot 38. Once the projection 36 is sufficiently inserted into the seatbelt buckle 22 via the slot 38, a lock mechanism (not shown) of the seatbelt buckle 22 engages the projection 36 of the tongue or latch plate 24, thereby securing the tongue or latch plate 24 to the seatbelt buckle 22.

When a user applies a force to the seatbelt webbing 18 to extract a length of the seatbelt webbing 18 from the retractor 20, the tongue or latch plate 24 may be moved along and relative to the seatbelt webbing 18 via the slot 34. Once the projection 36 of the tongue or latch plate 24 is secured within the slot 38 of the seatbelt buckle 22, the retractor 20 may exert a force on the seatbelt webbing 18 to retract a length of the seatbelt webbing 18 back into the retractor 20. In so doing, the retractor 20 ensures that the seatbelt webbing 18 fits properly and snugly against a lap and torso of the occupant during use.

At this point, lengths of the cross-body segment 30 and the lap segment 32 of the seatbelt webbing 18 are generally defined. As can be appreciated, a relative position between the tongue or latch plate 24 and the seatbelt webbing 18 will vary based upon the size of the occupant seated on the seat 14. For example, when a larger occupant is seated 14, a greater length of webbing 18 must be extended from the retractor 20 to accommodate the larger occupant as compared to, for example, a smaller occupant requiring a shorter length of seatbelt webbing 18. Accordingly, the tongue or latch plate 24 will be positioned at a different location along the seatbelt webbing 18 for different vehicle occupants, as the length of the seatbelt webbing 18 required to be extended from the retractor 20 will vary based on the size of the occupant. Likewise, vehicle seat position may affect the length of seatbelt webbing 18 extended from the retractor 20. For instance, for a person in a full-forward seat position, a longer length of seatbelt webbing 18 may be extended from the retractor 20 than for this person if they were sitting in a full-rear seat position.

Regardless of the size of the occupant seated on the seat 14, the seat 14 position, and the length of the seatbelt webbing 18 extended from the retractor 20, engagement of the projection 36 of the tongue or latch plate 24 with the seatbelt buckle 22 may be detected by a buckle sensor 40 associated with the seatbelt buckle 22. The buckle sensor 24 detects the presence of the projection 36 disposed within the seatbelt buckle 22 and, as such, produces a signal indicative of the presence of the projection 36 within the seatbelt buckle 22. Detection of the projection 36 within the seatbelt buckle 22 allows the buckle sensor 40 to identify when the tongue or latch plate 24 is securely engaged with the lock mechanism of the seatbelt buckle 22.

When an occupant sits on the seat 14 and extends a portion of the seatbelt webbing 18 from the retractor 20 a sufficient distance in a direction toward the seatbelt buckle 22, the projection 36 of the tongue or latch plate 24 is received within the slot 38. When the projection 36 is sufficiently inserted into the seatbelt buckle 22, the buckle sensor 40 may detect the presence of the projection 36 and generate a signal indicative of the projection 36 being engaged with lock mechanism of the seatbelt buckle 22.

With continued reference to FIG. 1, the vehicle system 10 further includes an occupant detection device (ODD) 42, a remote sensor 44, and an internal user interface device (UID) 46. The ODD 42 may include a weight pad (not shown) disposed within a seat bottom 48 of the seat 14. The weight pad is positioned relative to the seat bottom 48 such that when an occupant is seated on the seat 14, the weight pad is able to detect the presence of the seated occupant. While the seat bottom 48 is described as including a weight pad to detect the presence of an occupant, the seat bottom 48 could additionally or alternatively include one or more pressure sensors, ohmmeters, capacitive sensors, resistive sensors, electric field proximity sensors, biometric sensors, and/or other types of sensors capable of detecting the presence of an occupant seated on the seat bottom 48.

The remote sensor 44 may be positioned within the cabin 12 such that the remote sensor 44 has a field-of-view that captures the seat 14. Accordingly, the remote sensor 44 may be used to detect the presence of an occupant seated on the vehicle seat 14. Additionally or alternatively, the remote sensor 44 may be used to determine whether the seatbelt webbing 18 is extended from the retractor 20 and, further, may be used to determine and/or verify the length of the seatbelt webbing 18 extended from the retractor 20. The foregoing information detected by the remote sensor 44 may be used in conjunction with the data provided by the ODD 42 to verify the presence of a vehicle occupant seated in the seat 14. Different types of remote sensors can be used such as a camera, radar, or LIDAR.

The internal UID 46 may be located within the cabin 12 and may include a display 50. The display 50 may be used to communicate information to occupants in the cabin 12 related to the use of the seatbelt assembly 16. Namely, the internal UID 46 may display information on the display 50 regarding whether an occupant is seated in the seat 14, whether the seatbelt assembly 16 is buckled, and/or whether the seatbelt assembly 16 is properly positioned relative to the occupant. In addition, the internal UID 46 can control an audible messaging system 47 and a haptic messaging system 49 which may be used to communicate information regarding whether an occupant is seated on the seat 14, whether the seatbelt is buckled, and/or whether the seatbelt assembly 16 is properly positioned relative to the occupant.

With continued reference to FIG. 1, outputs from the seatbelt payout sensor(s) 28, the buckle sensor 40, the ODD 42, and the remote sensor 44 are provided to a body control module (BCM) 52. Accordingly, the BCM 52 receives data from the seatbelt payout sensor(s) 28 related to the length of seatbelt webbing 18 extended from the retractor 20, from the buckle sensor 40 whether the projection 36 of the tongue or latch plate 24 is securely attached to the lock mechanism of the seatbelt buckle 22, from the ODD 42 related to whether an occupant is seated on the seat 14, and from the remote sensor 44 pertaining to the presence of an occupant on the vehicle seat 14 and/or the length of seatbelt webbing 18 extended from the retractor 20. As mentioned above, the seatbelt assembly 16 will hereinafter be described and shown as including a single retractor 20 associated with the seat 14. However, the anchor 26 could be replaced with an additional retractor 20 and associated seatbelt payout sensor 28. If the seatbelt assembly 16 includes a retractor 20 in place of the anchor 26, the length of the seatbelt webbing 18 extended from the lower retractor 20—as detected by the associated seatbelt payout sensor 28—would similarly be supplied to the BCM 52 for use by the BCM 52 in determining whether the seatbelt assembly 16 is in proper use.

The output from the seatbelt payout sensor 28 is identified in FIG. 1 along communication line RS1. The output from the buckle sensor 42 to the BCM 52 is identified along communication line BS. The output of the ODD 42 is identified via communication line ODD while the output from the remote sensor 44 is identified along communication line C. Finally, if the seatbelt assembly 16 includes a second retractor 20 in place of the anchor 26, and an associated seatbelt payout sensor 28, the output from the seatbelt payout sensor 28 associated with the lower retractor 20 is shown as extending along communication line RS2. As will be described in greater detail below, the various sensor inputs RS1, RS2, BS, ODD, C, are received by the BCM 52 for use by the BCM 52 in monitoring and diagnosing use of the seatbelt assembly 16.

Figure 2:
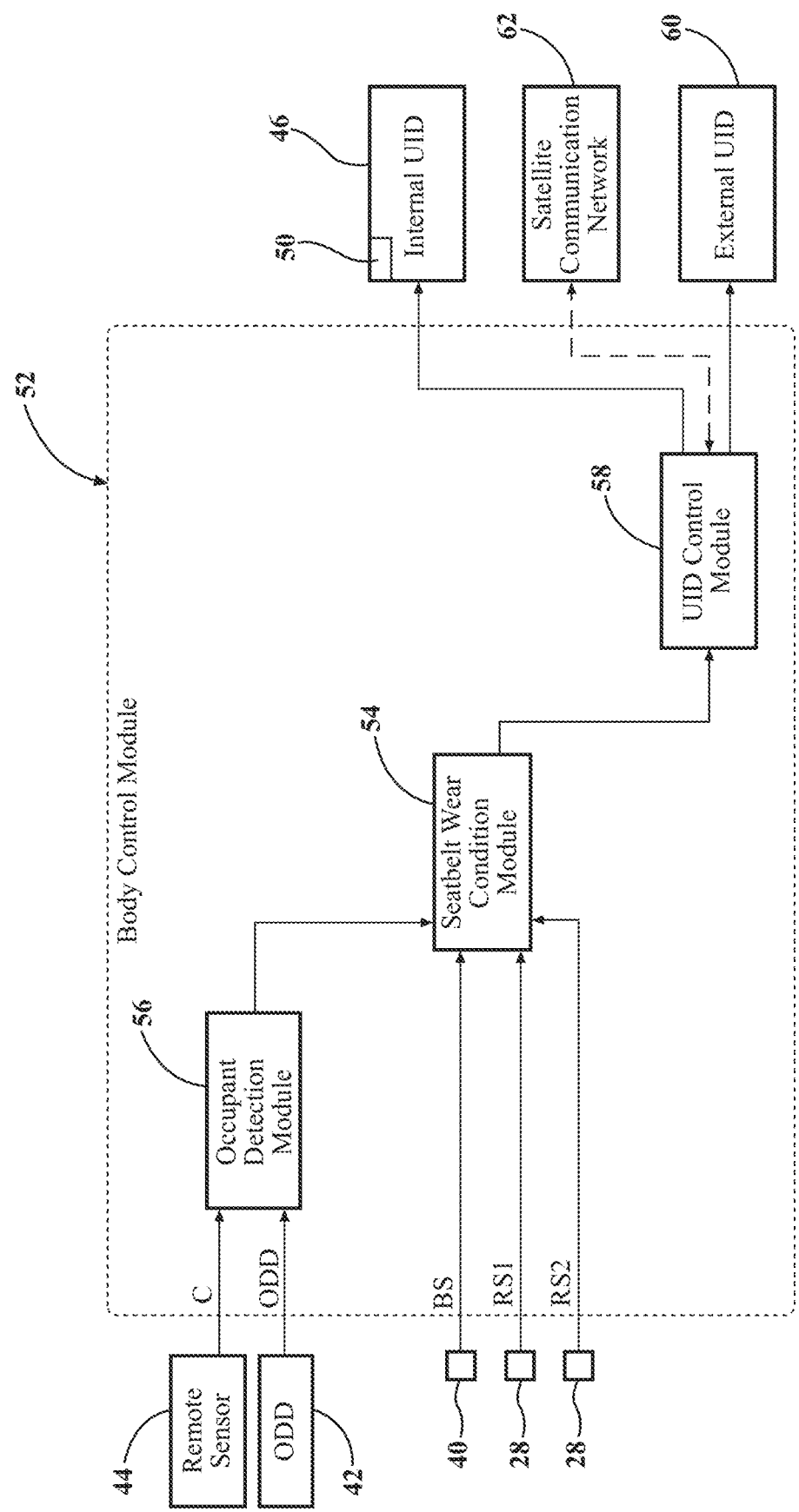
FIG. 2 is a functional block diagram of an example control system in accordance with the principles of the present disclosure for use for use in conjunction with the vehicle system of FIG. 1.

With particular reference to FIG. 2, the body control module 52 is shown as including a seatbelt wear condition module 54, an occupant detection module 56, and a UID control module 58. As shown, the seatbelt wear condition module 54 is in communication with the seatbelt payout sensor 28 and the buckle sensor 40. The seatbelt wear condition module 54 receives information from the seatbelt payout sensor 28 regarding the length of the seatbelt webbing 18 extended from the retractor 20 via communication line RS1 and possibly RS2 and receives information regarding whether the tongue or latch plate 24 is in engaged with the lock mechanism of the seatbelt buckle 22 from the buckle sensor 40 via communication line BS.

The occupant detection module 56 is in communication with the seatbelt wear condition module 54 and receives information from the ODD 44 and remote sensor 44. The occupant detection module 56 receives information from the ODD 42 via communication line ODD regarding whether the ODD 42 detects the presence of an occupant seated on the seat 14. The remote sensor 44 may provide information to the occupant detection module 56 regarding whether an occupant is detected as being seated on the seat 14 and/or regarding the length of the seatbelt webbing 18 extended from the retractor 20 via the communication line C.

As will be described in greater detail below with respect to FIGS. 5-7, the seatbelt wear condition module 54 monitors the state of the seatbelt assembly 16 and, more particularly, may be used to determine the presence a seatbelt buckle extender. The seatbelt wear condition module 54 is in communication with the UID control module 58 to provide the UID control module 58 with information regarding the state of the seatbelt assembly 16. For example, the seatbelt wear condition module 54 may provide information to the UID control module 58 that an occupant is seated on the seat 14 and, further, that the occupant is properly buckled. Alternatively, the seatbelt wear condition module 54 may determine that an occupant is not present on the seat 14 but a tongue or latch plate 24 associated with a seatbelt buckle extender is received by the seatbelt buckle 22 while the seat belt payout is below a threshold indicating a stowed state. In such a circumstance, the seatbelt wear condition module 54 may determine that a seatbelt buckle extender is engaged with the seatbelt buckle 22. As yet another alternative, the seatbelt wear condition module 54 may determine that an occupant was present on the seat 14 when the tongue or latch plate 24 associated with a seatbelt buckle extender is received by the seatbelt buckle 22 and the payout of the seatbelt webbing 18 from the retractor 20 is at a stowed length and the seatbelt webbing 18 later moves to a worn length while the occupant is present on the seat 14. In such a circumstance, the seatbelt wear condition module 54 may also determine that a seatbelt buckle extender is engaged with the seatbelt buckle 22. The seatbelt wear condition module 54 may communicate the foregoing information to the UID control module 58 for communication by the internal UID 46 on the display 50 and/or via an audible messaging system 47 and/or a haptic messaging system 49. Additionally or alternatively, information from the UID control module 58 may be sent directly to an external UID 60 and/or a satellite communication network 62.

The information pertaining to the condition of the seatbelt assembly 16 may be displayed on the external UID 60. For example, the external UID 60 may be a smartphone or a tablet associated with the vehicle's owner or occupant(s). Information pertaining to the seatbelt assembly 16 may be displayed by the external UID 60 on such a smartphone or tablet. Finally, the UID control module 58 may communicate information from the seatbelt wear condition module 54 regarding the state of the seatbelt assembly 16 to the satellite communication network 62, which may be in communication with one or both of the internal UID 46 and the external UID 60. As with the direct communication between the UID control module 58 and the internal UID 46 and the external UID 60, the satellite communication network 62 may provide information from the UID control module 58 as to the state of the seatbelt assembly 16 to one or both of the internal UID 46 and the external UID 60.

With particular reference to FIGS. 3 and 4, an occupant is shown seated on the seat 14. In FIG. 3, the occupant is seated on the seat 14 and the seatbelt assembly 16 is shown as being worn across a torso and a lap of the occupant. The seatbelt assembly 16 shown in FIG. 3 includes the tongue or latch plate 24 of the seatbelt assembly 16 being engaged with the seatbelt buckle 22 to restrain the occupant on the seat 14. Specifically, and as described above, the projection 36 of the tongue or latch plate 24 is received by the slot 38 of the seatbelt buckle 22 and is secured within the seatbelt buckle 22 by the lock mechanism of the seatbelt buckle 22. In the illustration shown in FIG. 3, the retractor 20 is shown as being located proximate to the seat bottom 48 and within external vehicle structure. In such an arrangement, the seatbelt webbing 18 extends from the retractor 20 in a direction away from the seat bottom 48 and is received by a routing guide or D-ring 64 located proximate to a shoulder of the occupant once seated on the seat 14.

The routing guide 64 slidably receives the seatbelt webbing 18 to allow the seatbelt webbing 18 to move relative to and within the routing guide 64. The routing guide 64 aids in properly positioning the seatbelt webbing 18 across a torso of an occupant when the seatbelt assembly 16 is in use and the tongue or latch plate 24 is secured to the seatbelt buckle 22. If the retractor 20 is alternatively located proximate to a shoulder of the occupant, the routing guide 64 may not be needed. Specifically, if the retractor 20 is located proximate to an occupant's shoulder, the seatbelt webbing 18 may be extended directly from the retractor 20 across the torso of an occupant during wear. Alternatively, if the seatbelt retractor 20 is located proximate to a shoulder of the occupant, the seatbelt webbing 18 may still be routed through a routing guide or D-ring 64 to permit adjustment of a height of the seatbelt webbing 18 relative to the seat 14. Specifically, the routing guide 64 may be attached to an adjustment mechanism (not shown) that allows for vertical adjustment of the routing guide 64 and, thus, the seatbelt webbing 18 relative to the seat 14. Specifically, for smaller occupants, the routing guide 64 may be moved in a direction toward the seat bottom 48 and may be moved in a direction away from the seat bottom 48 for larger occupants. Adjusting the height of the routing guide 64 adjusts the effective starting location of the cross-body segment 30 of the seatbelt webbing 18 to accommodate users of varying heights and sizes.

As described above, the routing guide 64 may be adjusted vertically relative to the seat 14 to accommodate occupants of varying sizes. However, when a routing guide 64 is moved to a maximum vertical distance away from the seat bottom 48 in combination with a larger occupant being seated in the seat 14, the length of the seatbelt webbing 18 may not be sufficient to extend over the torso and lap of the occupant and, thus, will not allow the tongue or latch plate 24 to properly engage the seatbelt buckle 22. In such circumstances, a seatbelt buckle extender 66 may be required to allow the seatbelt webbing 18 to properly restrain an occupant in the seat 14.

With reference to FIGS. 4 and 4A, a seatbelt buckle extender 66 is shown in conjunction with the seatbelt assembly 16 and includes an extender buckle 68, extender webbing 70, and an extender tongue or latch plate 72. The buckle 68 may be similar to the seatbelt buckle 22 associated with the seatbelt assembly 16 and may similarly include a lock mechanism (not shown) that selectively attaches the tongue or latch plate 24 of the seatbelt assembly 16 to the seatbelt buckle extender 66. The extender tongue or latch plate 72 is disposed at an opposite end of the seatbelt buckle extender 66 then the buckle 68 and may be identical to the tongue or latch plate 24 of the seatbelt assembly 16. Accordingly, the extender tongue or latch plate 72 may include a projection 74 that is selectively received by the seatbelt buckle 22 to secure the extender tongue or latch plate 72 to the buckle 22.

The extender webbing 70 may be identical to the seatbelt webbing 18 and extends between the extender buckle 68 and the extender tongue or latch plate 72. Specifically, the extender webbing 70 includes a first end fixedly attached to the extender buckle 68 and a second end fixedly to the extender tongue or latch plate 72. As another alternative, the extender webbing 70 may be replaced with a generally inflexible structural bar (not shown) so that the seat belt extender 66 is generally inflexible.

In operation, an occupant may insert the projection 74 of the seatbelt buckle extender 66 into the slot 38 of the seatbelt buckle 22 to secure the extender tongue or latch plate 72 to the seatbelt buckle 22 of the seatbelt assembly 16. Securing the extender tongue or latch plate 72 to the seatbelt buckle 22 likewise secures the extender buckle 68 and the extender webbing 72 to the seatbelt buckle 22.

Once the extender tongue or latch plate 72 is secured to the seatbelt buckle 22, the tongue or latch plate 24 of the seatbelt assembly 16 may be secured to the extender buckle 68. Specifically, the projection 36 of the tongue or latch plate 24 may be inserted into the extender buckle 68 to secure the tongue or latch plate 24 of the seatbelt assembly 16 to the extender buckle 68. Alternatively, this installation order can be reversed with the seatbelt buckle extender 66 being attached to the tongue or latch plate 24 before it is attached to the seatbelt buckle 22. Once the tongue or latch plate 24 of the seatbelt assembly 16 is secured to the extender buckle 68, the tongue or latch plate 24 of the seatbelt assembly 16 is effectively secured to the seatbelt buckle 22 via the seatbelt buckle extender 66. In effect, the seatbelt buckle extender 66 moves the attachment location of the tongue or latch plate 24 closer to the retractor 20 or routing guide 64 (if present) in an effort to reduce the length of seatbelt webbing 18 required to restrain the occupant on the seat 14. In so doing, the required lengths of the cross-body segment 30 and the lap segment 32 are reduced, thereby allowing a conventional seatbelt assembly 16 to be used in conjunction with securing a larger occupant on the seat 14.

While the seatbelt buckle extender 66 is useful in securing a larger occupant on the seat 14 with the seatbelt assembly 16, differentiating between use of the seatbelt buckle extender 66 and the tongue or latch plate 24 of the seatbelt assembly 16 is difficult, as the buckle sensor 40 registers the presence of the tongue or latch plate 24 of the seatbelt assembly 16 or the tongue or latch plate 72 of the seatbelt buckle extender 66 without differentiating between the two. Namely, when the extender tongue or latch plate 72 is received by and secured with the seatbelt buckle 22, the buckle sensor 40 may detect the presence of the extender tongue or latch plate 72 and communicate to the BCM 52 that the tongue or latch plate 24 is secured to the seatbelt buckle 22. For example, an occupant may first sit in the seat 14, insert the extender tongue or latch plate 72 into the seatbelt buckle 22, and then subsequently insert the tongue or latch plate 24 of the seatbelt assembly 16 into the extender buckle 68. In another condition, an occupant may insert the extender tongue or latch plate 72 into the seatbelt buckle 22 of the seatbelt assembly 16 before sitting in the seat 14. Once seated, the occupant may then insert the tongue or latch plate 24 of the seatbelt assembly 16 into the extender buckle 68. Finally, in either of the foregoing scenarios, the occupant may leave the seatbelt buckle extender 66 attached to tongue or latch plate 24 of the seatbelt assembly 16 when exiting the cabin 12. Alternatively, in either of the forgoing scenarios, the occupant may leave the seatbelt buckle extender 66 attached to the seatbelt buckle 22.

In each of the foregoing situations, the BCM 52 will identify when a seatbelt buckle extender 66 is used in conjunction with the seatbelt assembly 16 and will differentiate between a properly buckled occupant, an improperly buckled occupant, and an unbuckled occupant. As set forth below, the BCM 52 will make the foregoing determinations based on information received from one or more of the seatbelt payout sensor(s) 28, the buckle sensor 40, the occupant detection device 42, and the remote sensor 44.

Figure 5:
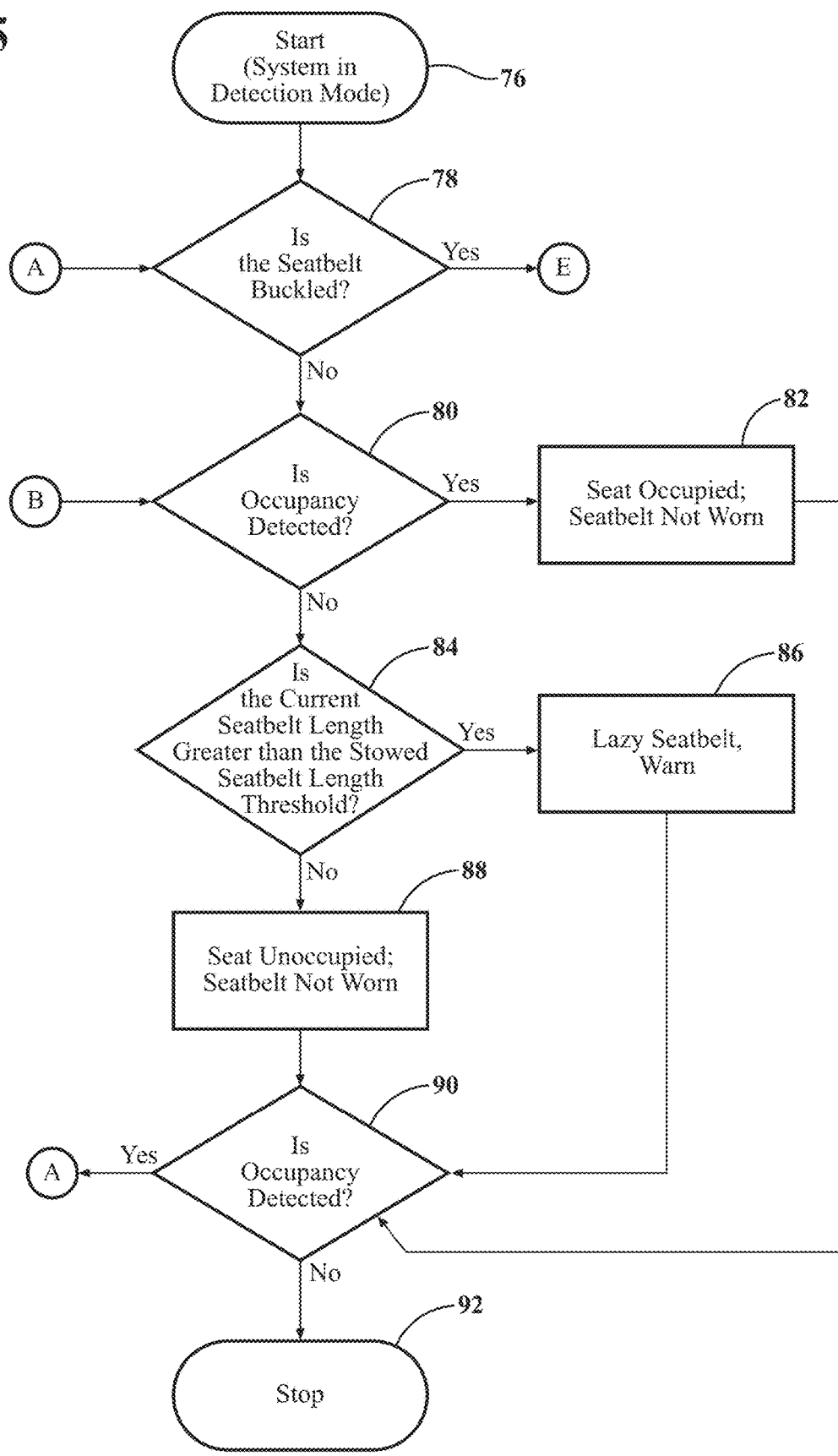
FIGS. 5-7 are flowcharts illustrating example methods for determining whether a seatbelt buckle extender is used in conjunction with a seatbelt assembly.
Figure 6:
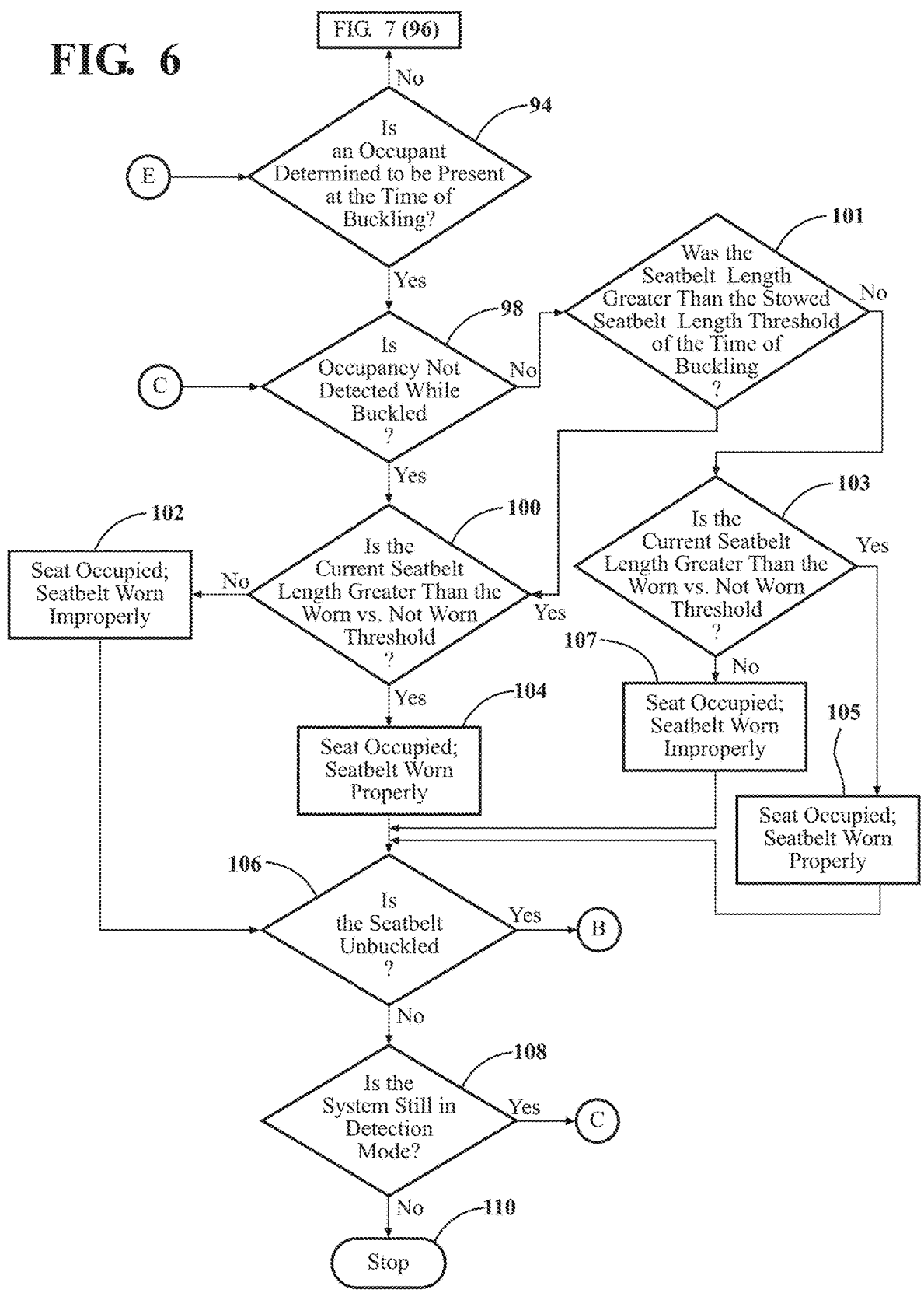
Figure 7:
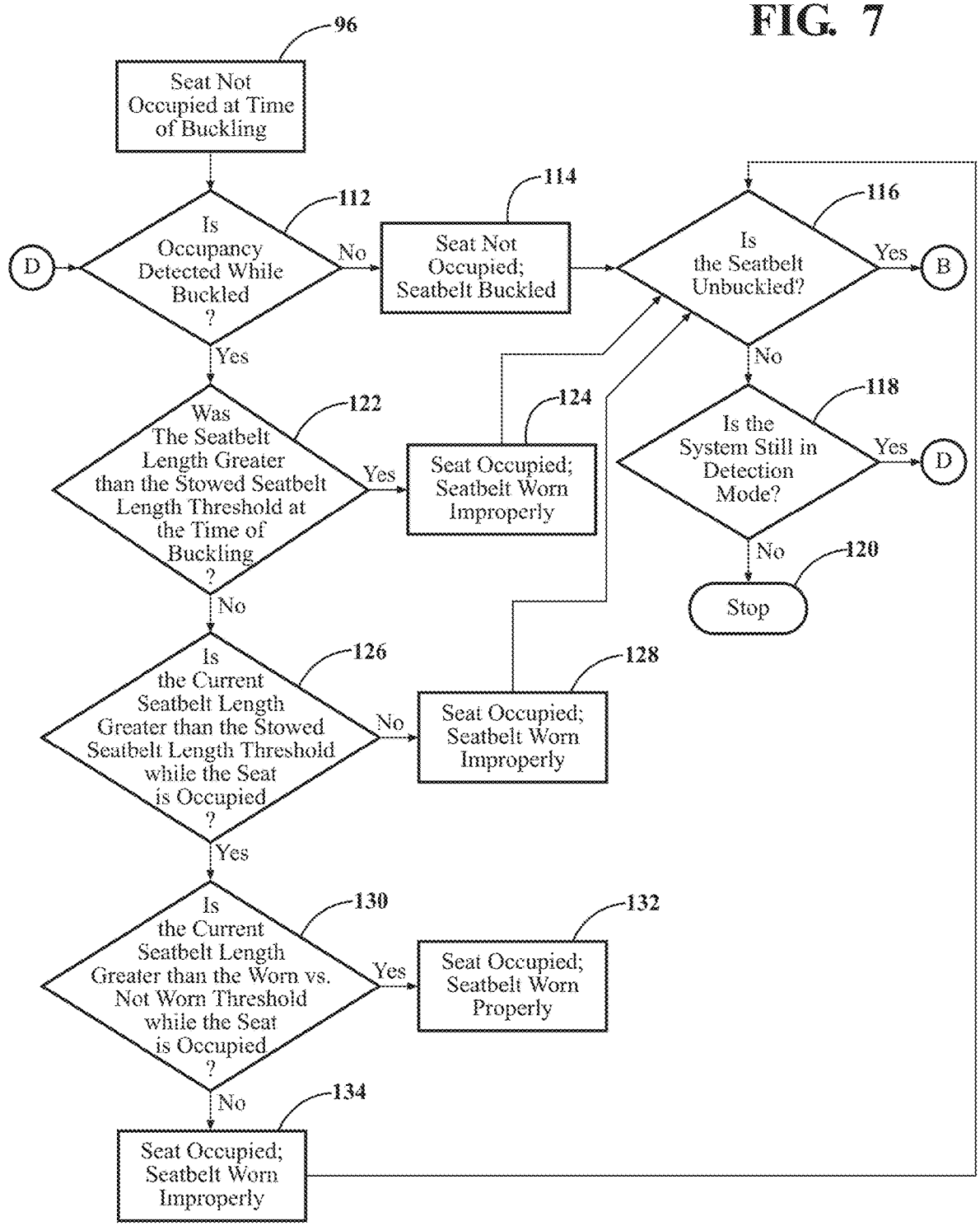

With particular reference to FIG. 5-7, a method for determining use of a seatbelt buckle extender 66 in conjunction with the seatbelt assembly 16 will be described in detail. The method may be performed by the seatbelt wear condition module 54 of the BCM 52 in conjunction with inputs from the various sensors 28, 40, 42, 44 and occupant detection module 56. The module 54 will also differentiate between a properly buckled occupant, an improperly buckled occupant, and an unbuckled occupant and communicate the status of the seatbelt assembly 16 to the UID control module 58 for communication to one or more of the internal UID 46, the external UID 60, and the satellite communication network 62.

The seatbelt wear condition module 54 starts in a detection mode at 76 (FIG. 5). The detection mode can be initiated when a door (not shown) of the vehicle system 10 is opened, a remote interior sensor such as the remote sensor 44 detects something in the cabin 12, the vehicle is started, a start ride button (not shown) is pressed, a vehicle door is closed, or the vehicle is placed into a drive mode. At this point, the seatbelt wear condition module 54 may initially determine whether the seatbelt assembly 16 is in a buckled state at 78 based information received from the buckle sensor 40. If the seatbelt assembly 16 is not identified by the buckle sensor 40 as being buckled, the seatbelt wear condition module 54 then determines whether occupancy is detected at 80. If occupancy is detected at 80, the seat 14 is identified as being occupied and the seatbelt is identified as not being worn at 82. If occupancy is not detected at 80, the seatbelt wear condition module 54 then determines whether the current length of the seatbelt webbing 18 extracted from the retractor 20 is greater than a stowed seatbelt length threshold of the seatbelt webbing 18 at 84.

The stowed seatbelt length threshold is set at a seatbelt length (i.e., a length of the seatbelt webbing 18 extracted from the retractor 20) that is between a stowed seatbelt length (i.e., when the seatbelt webbing 18 is wound within the retractor 20 and is in a stowed state) and a worn seatbelt length. The worn seatbelt length may be set at a length where a size of a predetermined occupant is seated in the seat 14.

For example, in one configuration, the worn seatbelt length threshold could be set at a length where a ten-year-old sized person wearing a seatbelt would be detected as the seatbelt being worn. The length of the seatbelt webbing 18 extended from the retractor 20 for such a ten-year-old sized person would be stored in the seatbelt wear condition module 54 as being the worn threshold seatbelt webbing length.

The current seatbelt length (i.e., the length of the seatbelt webbing 18 extended from the retractor 20) is detected by the seatbelt payout sensor 28 associated with the retractor 20. The seatbelt payout sensor 28 may detect the length of seatbelt webbing 18 extended from the retractor 20 and may provide this information to the seatbelt wear condition module 54 via the communication line RS1. As discussed above, if the seatbelt assembly 16 includes a lower retractor 20, the lower retractor 20 would similarly include a seatbelt payout sensor 28 that provides the seatbelt wear condition module 54 with information relating to the length of seatbelt webbing 18 extended from the lower retractor 20. This information would be communicated from the seatbelt payout sensor 28 associated with the lower retractor 20 to the seatbelt wear condition module 54 via the communication line RS2, as shown in FIGS. 1 and 2.

If the current seatbelt length is greater than the stored seatbelt length threshold, the seatbelt wear condition 52 may determine that the seatbelt webbing 18 is in a "lazy" state at 86. At this point, the seatbelt wear condition module 54 may determine that a seatbelt buckle extender 66 remains attached to the tongue or latch plate 24 of the seatbelt assembly 16 even though the extender tongue or latch plate 72 of the seatbelt buckle extender 66 is disengaged from the seatbelt buckle 22. The seatbelt webbing 18 may be determined as being "lazy" due to the seatbelt webbing 18 sagging under the weight of the seatbelt buckle extender 66 being attached to the tongue or latch plate 24 of the seatbelt assembly 16. In other words, the retractor 20 does not fully retract the seatbelt webbing 18 into a housing of the retractor 20 due to the weight of the seatbelt buckle extender 66 when the extender 66 remains engaged with the tongue or latch plate 24. Accordingly, the seatbelt webbing 18 does not return fully to a retracted state due the weight of the seatbelt buckle extender 66. In such a condition, the seatbelt wear condition module 54 may communicate to the UID control module 58 that the seatbelt assembly 16 is in a lazy seatbelt condition (i.e., at 86 in FIG. 5) to one or more of the internal UID 46, the external UID, and the satellite communication network 62.

If the current seatbelt length of the seatbelt webbing 18 is not greater than the stowed seatbelt length threshold, the seatbelt wear condition module determines that the seat 14 is unoccupied and that the seatbelt is not worn at 88. After each of steps 82, 86, and 88, the seatbelt wear condition module 54 determines whether occupancy is detected at 90. Occupancy may be detected based on information received from the occupant detection module 56. Specifically, the occupant detection module 56 may rely on information from the ODD 42 and/or the remote sensor 44 to determine whether an occupant is seated on the seat 14. Information from the ODD 42 and/or the remote sensor 44 may be provided to the occupant detection module 56 via communication lines ODD, C, respectively, as shown in FIG. 2. If the seatbelt wear condition module 54 determines that an occupant is in the seat 14 at 90, the seatbelt wear condition module 54 returns to step 78 to determine whether the seatbelt is buckled. If the seatbelt wear condition module 54 does not determine an occupant on the seat 14 at 90, the seatbelt wear condition module 54 stops at 92.

Returning to step 78, if the seatbelt assembly 16 is determined to be in a buckled state, the seatbelt wear condition module 54 then determines whether an occupant is determined to be present at the time of buckling at 94 (FIG. 6). As with step 90, the seatbelt wear condition module 54 may determine whether an occupant is present within the cabin 12 based on information from the occupant detection module 56. Specifically, information from the ODD 42 and/or the remote sensor 44 provided to the occupant detection module 56 via communication lines ODD, C, respectively, provides the seatbelt wear condition module 54 with an indication as to whether an occupant is present within the cabin 12.

If the seatbelt wear condition module 54 determines that an occupant is not present within the cabin 12 at 94, the seatbelt wear condition 54 determines that the seat 14 is not occupied at the time of buckling at 96 (FIG. 7). If, on the other hand, the seatbelt wear condition module 54 determines that an occupant is present within the cabin 12 at the time of buckling at 94, the seatbelt wear condition module 54 then determines whether occupancy is not detected while buckled at 98.

If occupancy is detected at 98, the seatbelt wear condition module 54 then determines whether the current length of the seatbelt webbing 18 as extended from the retractor 20 is greater than the stowed seatbelt length threshold while the seat is occupied at 101. If the current length of the seatbelt webbing 18 extended from the retractor 20 is greater, the method proceeds to 100. If the current length of the seatbelt webbing 18 extended from the retractor 20 is not greater than the stowed seatbelt length threshold at 101, the seatbelt wear condition module 54 then determines whether the current length of the seatbelt webbing 18 as extended from the retractor 20 is greater than the worn seatbelt length threshold at 103. If the current length of the seatbelt webbing 18 extended from the retractor 20 is not greater than the worn seatbelt length threshold while the seat 14 is occupied at 103, the seatbelt wear condition module 54 determines that the seat 14 is occupied and the seatbelt is worn improperly at 107. In this situation, the seatbelt could be pulled out of the retractor 20 and held/wrapped around an object without restraining the occupant with a fake latch plate or other latch plate buckled into the buckle 22. After this, the seatbelt wear condition module 54 determines whether the seatbelt is unbuckled at 106. If the seatbelt is determined to be unbuckled at 106, the seatbelt wear condition module 54 returns to step 80 (FIG. 5) to determine whether occupancy is detected, as discussed previously. If the seatbelt wear condition module 54 determines that the seatbelt is buckled (i.e., via the buckle sensor 40 associated with seatbelt buckle 22) at 106, the seatbelt wear condition module 54 then determines whether the system is still in the detection mode at 108. If the seatbelt wear condition module 54 determines that the system is still in the detection mode at 108, the seatbelt wear condition module 54 returns to step 98 to determine whether occupancy was not detected while buckled. If the seatbelt wear condition module 54 determines that the system is no longer in the detection mode at 108, the seatbelt wear condition module 54 stops at 110.

If the current length of the seatbelt webbing 18 extended from the retractor 20 is greater than the worn seatbelt length threshold while the seat 14 is occupied at 103, the seatbelt wear condition module 54 determines that the seat 14 is occupied and the seatbelt is worn properly at 105. In this situation, the seat 14 is occupied, the seatbelt is properly worn, and a seatbelt buckle extender 66 was used and buckled into the buckle 22 after the occupant sat on the seat 14. After this, the seatbelt wear condition module 54 determines whether the seatbelt is unbuckled at 106. If the seatbelt is determined to be unbuckled at 106, the seatbelt wear condition module 54 returns to step 80 (FIG. 5) to determine whether occupancy is detected, as discussed previously. If the seatbelt wear condition module 54 determines that the seatbelt is buckled (i.e., via the buckle sensor 40 associated with seatbelt buckle 22) at 106, the seatbelt wear condition module 54 then determines whether the system is still in the detection mode at 108. If the seatbelt wear condition module 54 determines that the system is still in the detection mode at 108, the seatbelt wear condition module 54 returns to step 98 to determine whether occupancy was not detected while buckled. If the seatbelt wear condition module 54 determines that the system is no longer in the detection mode at 108, the seatbelt wear condition module 54 stops at 110.

If occupancy is not detected while buckled at 98, the seatbelt wear condition module 54 then determines whether the current length of the seatbelt webbing 18 is greater than a worn versus non-worn threshold at 100. Again, the current length of the seatbelt webbing 18 is the length of the seatbelt webbing 18 extended from the retractor 20 as measured by the seatbelt payout sensor payout 28 associated with the retractor 20.

The worn versus not worn threshold could be set at a length where a ten-year-old sized person wearing a seatbelt would be detected as WORN and someone slightly smaller wearing a seatbelt would be detected as NOT-WORN. At step 100, the current length of the seatbelt webbing 18 that is extended from the retractor 20 is compared to the worn versus non-worn threshold. If the seatbelt wear condition module 54 determines that the current length of the seatbelt webbing 18 extended from the retractor 20 is not greater than the worn versus non-worn threshold, the seatbelt wear condition module 54 determines that the seat is occupied and the seatbelt is worn improperly at 102. The seatbelt might be improperly worn in this situation due to an occupant buckling the seatbelt behind the occupant or due to a child that is too small to sit on the seat 14 without use of a child restraint seat. At this point, the seatbelt wear condition module 54 may issue a warning via the UID control module 58 to communicate the warning to one or more of the internal UID 46, the external UID 60, and the satellite communication network 62. Under such circumstances, the internal UID 46, for example, may display a warning on the display 50 within the cabin 12 to alert the driver and/or other occupant(s) that a seat 14 is occupied and a seatbelt associated with the seat 14 is not worn properly.

If the current length of the seatbelt webbing 18 extended from the retractor 20 is identified by the seatbelt wear condition module 54 as being greater than the worn versus non-worn threshold at 100, the seatbelt wear condition module 54 determines that the seat is occupied and the seatbelt is worn properly at 104. After steps 102 or 104, the seatbelt wear condition module 54 determines whether the seatbelt is unbuckled at 106. If the seatbelt is determined to be unbuckled at 106, the seatbelt wear condition module 54 returns to step 80 (FIG. 5) to determine whether occupancy is detected, as discussed previously. If the seatbelt wear condition module 54 determines that the seatbelt is buckled (i.e., via the buckle sensor 40 associated with seatbelt buckle 22) at 106, the seatbelt wear condition module 54 then determines whether the system is still in the detection mode at 108. If the seatbelt wear condition module 54 determines that the system is still in the detection mode at 108, the seatbelt wear condition module 54 returns to step 98 to determine whether occupancy was not detected while buckled. If the seatbelt wear condition module 54 determines that the system is no longer in the detection mode at 108, the seatbelt wear condition module 54 stops at 110.

If the seatbelt wear condition module 54 determines that an occupant is not present at the time of buckling at 94 (FIG. 6), the seat 14 is determined to be unoccupied at the time of buckling at 96 (FIG. 7) as previously discussed. At this point, the seatbelt wear condition module 54 determines whether occupancy is detected while buckled at 112 (FIG. 7). If the seatbelt wear condition module 54 determines that occupancy is not detected while buckled, the seatbelt wear condition module 54 determines that the seat 14 is not occupied and, further, that the seatbelt is buckled at 114. Specifically, the seatbelt wear condition module 54 may determine that the seat 14 is unoccupied based on information received from the occupant detection module 56 and may determine that the seatbelt is buckled based on information received from the buckle sensor 40 associated with the seatbelt buckle 22. If the seat 14 is identified by the seatbelt wear condition module 54 as not being occupied and that the seatbelt is determined to be buckled at 114, the seatbelt wear condition module 54 determines whether the seatbelt is unbuckled at 116 and, if so, returns to step 80 (FIG. 5) to determine whether occupancy is detected. If the seatbelt is determined to be unbuckled at 116, the seatbelt wear condition module 54 then determines whether the system is still in the detection mode at 118 and, if so, returns to step 112 to determine whether occupancy is detected while buckled. If the system is no longer in the detection mode at 118, the seatbelt wear condition module 54 stops at 120.

If the seatbelt wear condition module 54 determines that an occupant is disposed on the seat 14 while buckled at 112, the seatbelt wear condition module 54 then determines whether the seatbelt length (i.e., the current length of the seatbelt webbing 18 extended from the retractor, as determined by the seatbelt payout sensor 28) is greater than the stowed seatbelt length threshold at the time of buckling at 122. If the current length of the seatbelt webbing 18 is greater than the stowed seatbelt length threshold at 122, the seatbelt wear condition module 54 then determines that the seat 14 is occupied and the seatbelt is worn improperly at 124. For example, an unrestrained occupant might be sitting on a buckled seatbelt. At this point, the seatbelt wear condition module 54 then determines whether the seatbelt is unbuckled at 116 and, if so, returns to step 80 (FIG. 5) and if not, proceeds to step 118 to determine whether the system is still in the detection mode. If so, the seatbelt wear condition module 54 moves to step 112 (FIG. 7) and, if not, stops at 120.

If the length of the seatbelt webbing is determined to be less that the stowed seatbelt length threshold at the time of buckling at 122, the seatbelt wear condition module 54 then determines whether the current length of the seatbelt webbing 18 as extended from the retractor 20 is greater than the stowed seatbelt length threshold while the seat is occupied at 126. If the current length of the seatbelt webbing 18 extended from the retractor 20 is not greater than the stowed seatbelt length threshold while the seat 14 is occupied at 126, the seatbelt wear condition module 54 determines that the seat 14 is occupied and the seatbelt is worn improperly at 128. For example, an adjacent seatbelt (i.e., not the assigned seatbelt) might be buckled into the buckle 22 of the seat 14. At this point, the seatbelt wear condition module 54 may communicate that the seatbelt is worn improperly to the UID control module 58 to warn the driver and other occupants(s) via the internal UID 46, the external UID 60, and/or the satellite communication network 62. For example, the warning may be displayed on the display 50 of the internal UID 46.

If the seat 14 is determined to be occupied at 128 and the seatbelt is determined to be worn improperly, the seatbelt wear condition module 54 then determines whether the seatbelt is unbuckled 116. If so, the seatbelt wear condition module 54 returns to step 80 (FIG. 5) to determine whether occupancy is detected. If the seatbelt is not unbuckled at 116, the seatbelt wear condition module 54 moves to step 118 to determine whether the system is still in the detection mode and, if so, moves to step 112 (FIG. 7). If not, the seatbelt wear condition module 54 stops at 120.

If the current length of the seat webbing 18 extended from the retractor 20 is greater than the stowed seatbelt length threshold while the seat 14 is occupied at 126, the seatbelt wear condition module 54 then determines whether the current seatbelt length is greater than the worn versus non-worn threshold while the seat is occupied at 130. If the seatbelt wear condition module 54 determines that the current seatbelt length is greater than the worn versus non-worn threshold while the seat 14 is occupied at 130, the seatbelt wear condition module 54 determines that the seat 14 is occupied and that the seatbelt is worn properly at 132. In this situation, the seat 14 is occupied, the seatbelt is properly worn, and a seatbelt buckle extender 66 was used and buckled into the buckle 22 before the occupant sat on the seat 14.

If the current seatbelt length is determined to be less than the worn versus non-worn threshold while the seat 14 is occupied at 130, the seatbelt wear condition module 54 determines that the seat 14 is occupied and that the seatbelt is worn improperly at 134. In this situation, the seatbelt could be pulled out of the retractor 20 and held/wrapped around an object without restraining the occupant with a fake latch plate or other latch plate buckled into the buckle 22. At this point, the seatbelt wear condition module 54 then returns to step 116 to determine whether the seatbelt is unbuckled. If so, the seatbelt wear condition module 54 returns to step 80 (FIG. 5) to determine whether occupancy is detected. If the seatbelt is determined to be buckled at step 116, the seatbelt wear condition module 54 then determines whether the system is still in the detection mode at 118 and, if so, returns to step 112 to determine whether occupancy is detected while buckled. If the system is no longer in the detection mode at 118, the seatbelt wear condition module 54 stops at 120.

The foregoing method set forth in FIGS. 5-7 allows the seatbelt wear condition module 54 to determine whether a seatbelt buckle extender 66 is used in conjunction with the seatbelt assembly 16. Further, the foregoing method allows the seatbelt wear condition module 54 to determine whether a seat 14 is occupied and, further, whether the seatbelt assembly 16 is worn properly or improperly. If the seatbelt assembly 16 is determined to be improperly worn by the seatbelt wear condition module 54 or is determined to be not worn, the seatbelt wear condition module 54 may warn one or more occupants via the UID control module 58, as previously discussed.

Figure 8:
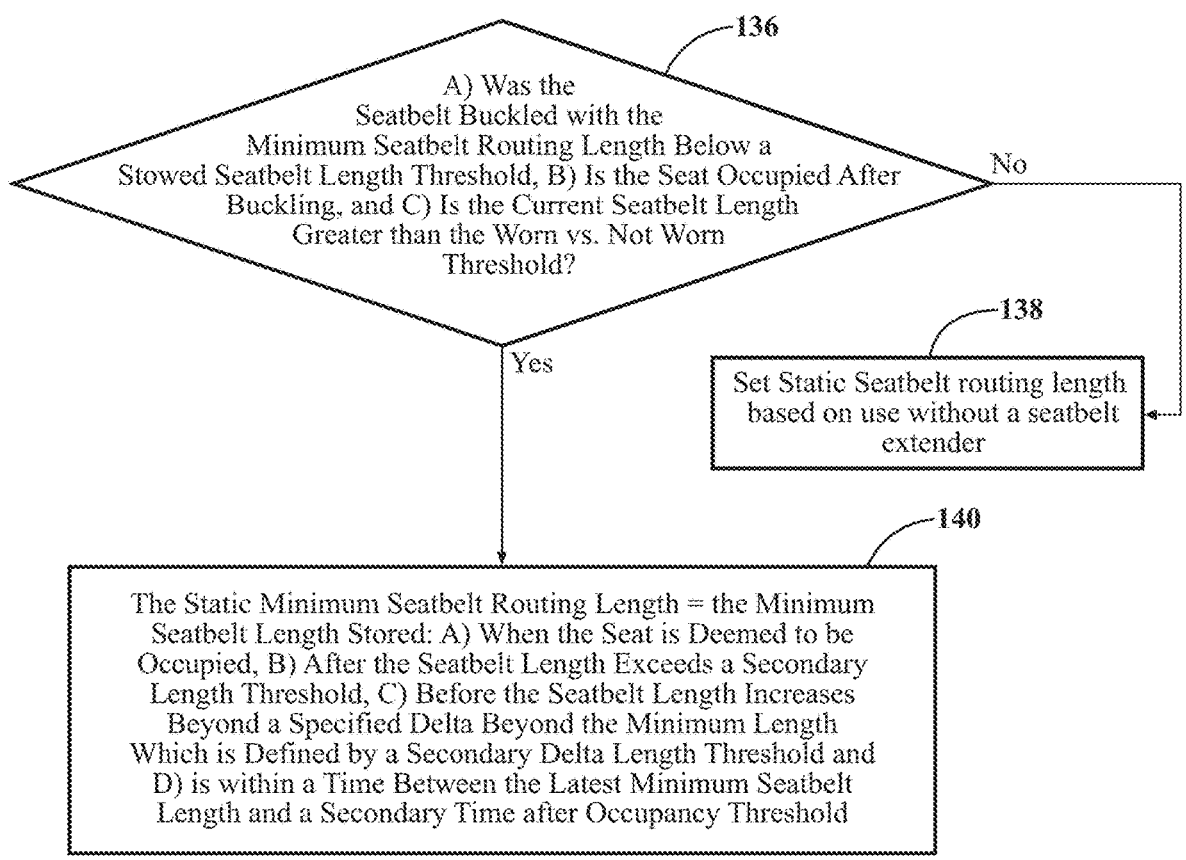
FIG. 8 is a flowchart illustrating a method for determining a static minimum seatbelt routing length.

With reference to FIG. 8, the calculation for the static minimum seatbelt routing length will be introduced. The static minimum seatbelt routing length is initially determined when the seatbelt is buckled. The static minimum seatbelt routing length is the minimum seat belt length a) after buckling within a predetermined timeframe, which is set by a time threshold duration after buckling, or b) prior to the seatbelt length increasing beyond a length threshold delta value above the minimum seatbelt length prior to the expiration of the time threshold duration after buckling. The static minimum seatbelt routing length is the minimum seatbelt length after buckling, which typically represents the seatbelt length when the seatbelt is properly worn over the occupant's body. The static minimum seatbelt routing length can be used in other seatbelt routing detection logic. In FIG. 8, seatbelt wear condition module 54 may determine and recalculate the static minimum seatbelt routing length following use of a seatbelt buckle extender 66. For example, when the seatbelt wear condition module 54 detects that a seatbelt buckle extender 66 was used when the seatbelt assembly 16 is buckled (with or without occupancy) and with the seatbelt having a seatbelt payout length indicating that it is stowed, followed by seat occupancy and a larger payout, the seatbelt wear condition module 54 will recalculate the static minimum seatbelt routing length based on the flowchart set forth in FIG. 8. Namely, at 136, the seatbelt wear condition module 54 will determine whether the tongue or latch plate 24 is secured within the seatbelt buckle 22 with a minimum routing length below a stowed seatbelt length threshold, will determine whether an occupant is seated in the seat 14 after the tongue or latch plate 24 is secured within the seatbelt buckle 22, and will determine whether the current seatbelt length is greater than the worn versus non-warn threshold. If the seatbelt wear condition module 54 determines that the foregoing parameters are not met at 136, the static seatbelt routing length is set based on the static minimum seatbelt routing length associated with a seatbelt assembly 16 when used without a seatbelt buckle extender 66 at 138.

Figure 9:
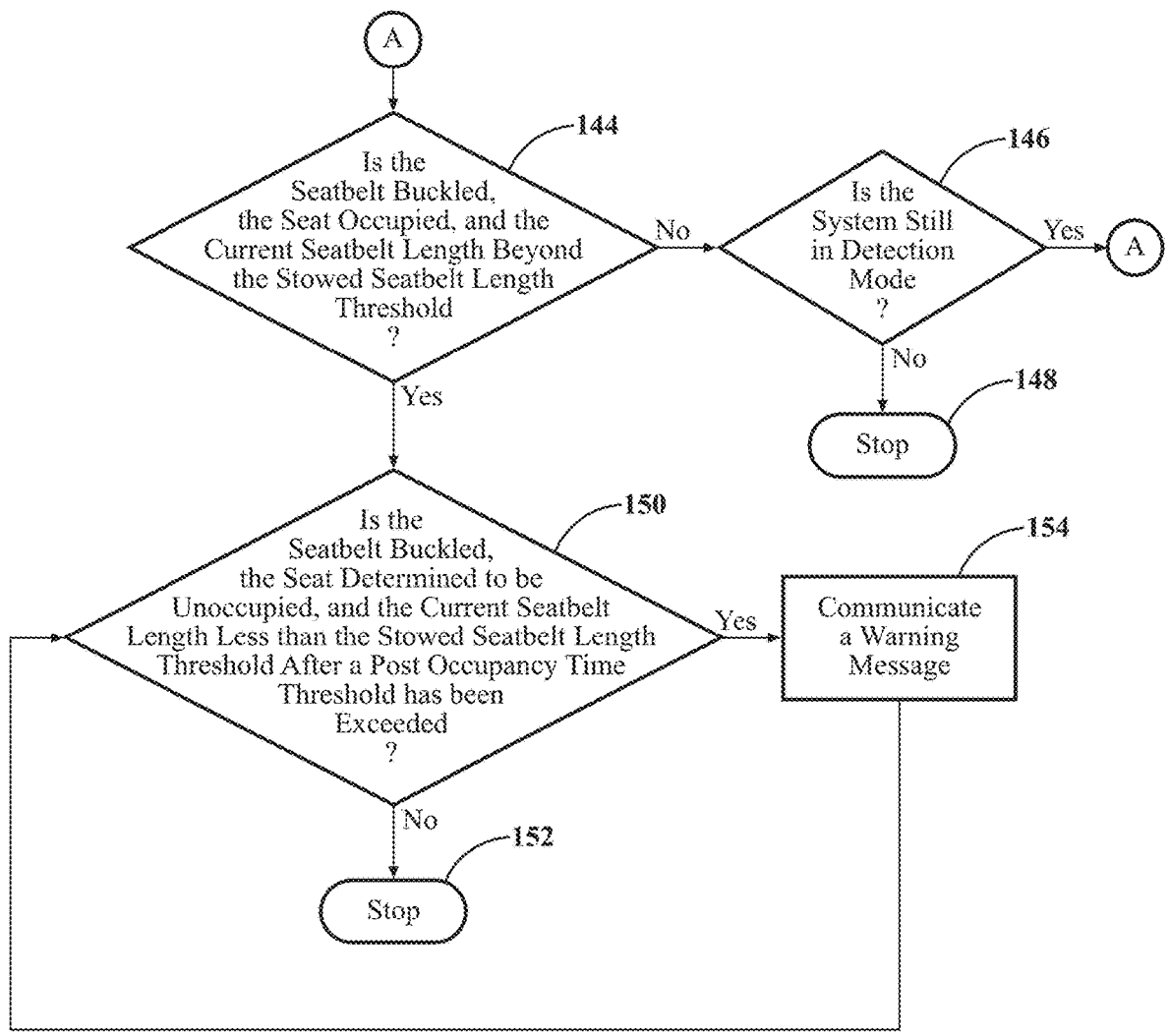
FIG. 9 is a flowchart illustrating a method for determining whether a seatbelt buckle extender remains attached to a tongue or latch plate of a seatbelt assembly following use of the seatbelt assembly.

If, on the other hand, the seatbelt wear condition module 54 determines that the seatbelt was buckled with a seatbelt routing length below a stowed seatbelt length threshold, the seat 14 was occupied after buckling, and the current seatbelt length is greater than the worn versus non-worn threshold at 136, the seatbelt wear condition module 54 moves to step 140 to recalculate the static minimum seatbelt routing length. Namely, the seatbelt wear condition module 54 recalculates the static minimum seatbelt routing length as the minimum seatbelt length a) after occupancy within a predetermined timeframe, which is set by a time threshold duration after occupancy, or b) prior to the seatbelt length increasing beyond a length threshold delta value above the minimum seatbelt length prior to the expiration of the time threshold duration after occupancy. With reference to FIG. 9, the seatbelt wear condition module 54 may determine whether the seatbelt buckle extender 66 remains buckled with the tongue or latch plate 24 of the seatbelt assembly 16 after unbuckling and an occupant is no longer detected on the vehicle seat 14. For example, if occupancy is detected at step 90 (FIG. 5), the seatbelt wear condition module 54 may determine whether the seatbelt is buckled, the seat 14 is occupied, and the current length of the seatbelt webbing 18 extending from the retractor 20 is beyond the stowed seatbelt length at 144. If the seatbelt is not buckled, the seat 14 is unoccupied, or the current seatbelt length is not beyond the stowed seatbelt length threshold at 144, the seatbelt wear condition module 54 will determine whether the system is in the detection mode at 146 and, if so, return to step 78 (FIG. 5). If not, the seatbelt wear condition module 54 will stop at 148.

If the seatbelt wear condition module 54 determines that the seatbelt is buckled, the seat 14 is occupied, and the current length of the seatbelt webbing 18 extended from the retractor 20 is beyond the stowed seatbelt length threshold at 144, the seatbelt wear condition module 54 will then determine whether the seatbelt is buckled, the seat 14 is determined to be unoccupied, and the current length of the seatbelt webbing 18 extending from the retractor 20 is less than the stowed seatbelt length threshold after a post occupancy time threshold has been exceeded at 150. If the results of step 150 are negative, the seatbelt wear condition module 54 will stop at 152. If, on the other hand, the results of step 150 are affirmative indicating that the seatbelt is buckled, the seat 14 is unoccupied, and the current length of the seatbelt webbing 18 is less than the stowed seatbelt length threshold, the seatbelt wear condition module 54 may communicate a warning message via the UID control module 58 to alert the vehicle occupant(s) that the seatbelt buckle extender 66 remains engaged with the tongue and latch plate 24 of the seatbelt assembly 16 and, thus, the seatbelt assembly 16 remains in a "lazy" state.

As described, the seat wear condition module 54 works in conjunction with an occupant detection module 56 and the UID control module 58 to alert a vehicle driver and occupant(s) as to the state of the seatbelt assembly 16 used in conjunction with the seat 14. Specifically, the seatbelt wear condition module 54 may alert the driver and other occupant(s) of the vehicle cabin 12 whether the seatbelt assembly 16 is not worn, worn improperly, or worn properly regardless of whether a seatbelt buckle extender 66 is used in conjunction with the seatbelt assembly 16. Further, the seatbelt wear condition module 54 may determine whether or not a seatbelt buckle extender 66 is used in conjunction with the seatbelt assembly 16 and, if so, remains attached to the tongue or latch plate 24 of the seatbelt assembly 16 (FIG. 9) following use.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A system comprising:
   a first webbing payout sensor configured to detect a first webbing payout of a seatbelt associated with a vehicle seat, the first webbing payout being a first length of webbing extended from a retractor of the seatbelt;
   an occupant detection module configured to identify a state of the vehicle seat, the occupant detection module identifying an occupied state when an occupant is seated on the vehicle seat and an unoccupied state when the vehicle seat is free from an occupant; and
   a seatbelt wear condition module in communication with the first webbing payout sensor and the occupant detection module and configured to identify whether a seatbelt buckle extender is used in conjunction with the seatbelt based on the first webbing payout and the state of the vehicle seat identified by the occupant detection module,
   wherein the seatbelt buckle extender comprises:
      a second length of webbing;
      a tongue or latch plate at a first end of the second length of webbing to selectively connect the seatbelt buckle extender to a seatbelt buckle; and
      a buckle at a second opposite end of the second length of webbing to selectively connect the seatbelt buckle extender to a tongue or latch plate of the seatbelt.

2. The system of claim 1, wherein the occupant detection module is in communication with at least one sensor configured to determine the presence of an occupant on the vehicle seat, the at least one sensor including at least one of a pressure sensor, a weight sensor, a resistive sensor, and a capacitive sensor located in the vehicle seat and a remote sensor including at least one of a camera, radar, and LIDAR having a field-of-view that encompasses the vehicle seat.

3. The system of claim 1, wherein the first webbing payout sensor is located at the retractor.

4. The system of claim 1, further comprising a buckle sensor in communication with the seatbelt wear condition module, the buckle sensor configured to detect a buckled state when a latch plate is secured to a buckle of the seatbelt and an unbuckled state when the buckle is separated from a latch plate.

5. The system of claim 4, wherein the seatbelt wear condition module is configured to determine use of a seatbelt buckle extender based on the buckle sensor identifying the buckled state, the occupant detection module identifying the unoccupied state at the time of buckling, and a payout of the webbing.

6. The system of claim 5, wherein the seatbelt wear condition module is configured to determine use of a seatbelt buckle extender based on (i) the buckle sensor identifying the buckled state, (ii) the occupant detection module identifying an occupied state at the time of buckling, (iii) the first webbing payout sensor determining that the webbing payout from the retractor is less than a first predetermined threshold at the time of buckling indicating that the seatbelt was in a stowed state at the time of buckling, and (iv) the first webbing payout sensor determining that the webbing payout from the retractor is more than a second predetermined threshold after buckling indicating that the seatbelt was in a worn state.

7. The system of claim 6, wherein the seatbelt wear condition module is configured to determine a new value for a static minimum seatbelt routing length.

8. The system of claim 4, wherein the seatbelt wear condition module is configured to determine use of a seatbelt buckle extender in response to the buckle sensor identifying the unbuckled state, the occupant detection module identifying the unoccupied state, and the first webbing payout being greater than a stowed webbing length.

9. The system of claim 4, wherein the seatbelt wear condition module is configured to determine use of a seatbelt buckle extender in response to the buckle sensor identifying the buckled state, the occupant detection module identifying the unoccupied state, and the first webbing payout being less than a stowed webbing length.

10. The system of claim 1, wherein the seatbelt wear condition module is in communication with a user interface device configured to communicate a state of the seatbelt.

11. A system comprising:
   a first webbing payout sensor configured to detect a first webbing payout of a seatbelt associated with a vehicle seat, the first webbing payout being a length of webbing extended from a retractor of the seatbelt;

a buckle sensor configured to detect a buckled state when a latch plate is secured to a buckle of the seatbelt and an unbuckled state when the buckle is separated from a latch plate; and a seatbelt wear condition module in communication with the first webbing payout sensor and the buckle sensor, the seatbelt wear condition module configured to identify whether a seatbelt buckle extender is used in conjunction with the seatbelt based on the first webbing payout and the state of the buckle identified by the buckle sensor, wherein the seatbelt buckle extender comprises:
a second length of webbing;
a tongue or latch plate at a first end of the second length of webbing to selectively connect the seatbelt buckle extender to a seatbelt buckle; and
a buckle at a second opposite end of the second length of webbing to selectively connect the seatbelt buckle extender to a tongue or latch plate of the seatbelt.

12. The system of claim 11, further comprising an occupant detection module configured to identify a state of the vehicle seat, the occupant detection module identifying an occupied state when an occupant is seated on the vehicle seat and an unoccupied state when the vehicle seat is free from an occupant.

13. The system of claim 12, wherein the occupant detection module is in communication with at least one sensor configured to determine the presence of an occupant on the vehicle seat, the at least one sensor including at least one of a pressure sensor, a weight sensor, and a capacitive sensor located in the vehicle seat and a remote sensor including at least one of a camera, radar, and LIDAR having a field-of-view that encompasses the vehicle seat.

14. The system of claim 12, wherein the seatbelt wear condition module is configured to determine use of a seatbelt buckle extender based on the buckle sensor identifying the buckled state, the occupant detection module identifying the unoccupied state at the time of buckling, and a payout of the webbing.

15. The system of claim 14, wherein the seatbelt wear condition module is configured to determine use of a seatbelt buckle extender based on (i) the buckle sensor identifying the buckled state, (ii) the occupant detection module identifying an occupied state at the time of buckling, (iii) the first webbing payout sensor determining that the webbing payout from the retractor is less than a first predetermined threshold at the time of buckling indicating that the seatbelt was in a stowed state at the time of buckling, and (iv) the first webbing payout sensor determining that the webbing payout from the retractor is more than a second predetermined threshold after buckling indicating that the seatbelt was in a worn state.

16. The system of claim 14, wherein the seatbelt wear condition module is configured to determine use of a seatbelt buckle extender in response to the buckle sensor identifying the buckled state, the occupant detection module identifying the unoccupied state, and the first webbing payout being less than a stowed webbing length.

17. The system of claim 12, wherein the seatbelt wear condition module is configured to determine use of a seatbelt buckle extender in response to the buckle sensor identifying the unbuckled state, the occupant detection module identifying the unoccupied state, and the first webbing payout being greater than a stowed webbing length.

18. The system of claim 11, wherein the seatbelt wear condition module is in communication with a user interface device configured to communicate a state of the seatbelt.

19. The system of claim 18, wherein the user interface device includes at least one of a display, an audible device, and a haptic device.

20. A system comprising:
a first webbing payout sensor configured to detect a first webbing payout of a seatbelt associated with a vehicle seat, the first webbing payout being a length of webbing extended from a retractor of the seatbelt;
an occupant detection module configured to identify a state of the vehicle seat, the occupant detection module identifying an occupied state when an occupant is seated on the vehicle seat and an unoccupied state when the vehicle seat is free from an occupant;
a buckle sensor configured to detect a buckled state when a latch plate is secured to a buckle of the seatbelt and an unbuckled state when the buckle is separated from a latch plate; and
a seatbelt wear condition module in communication with the first webbing payout sensor, the buckle sensor, and the occupant detection module and configured to identify a lazy seatbelt condition in response to the buckle sensor identifying the unbuckled state, the occupant detection module identifying the unoccupied state, and the first webbing payout being greater than a stowed webbing length, the seatbelt wear condition module identifying use of a buckle extender in conjunction with the seatbelt when the lazy seatbelt condition is identified, wherein the seatbelt buckle extender comprises:
a second length of webbing;
a tongue or latch plate at a first end of the second length of webbing to selectively connect the seatbelt buckle extender to a seatbelt buckle; and
a buckle at a second opposite end of the second length of webbing to selectively connect the seatbelt buckle extender to a tongue or latch plate of the seatbelt.

* * * * *